United States Patent
Vehmeijer et al.

(10) Patent No.: US 11,008,726 B2
(45) Date of Patent: May 18, 2021

(54) METHOD FOR INSTALLATION OF A PILE ADAPTED TO SUPPORT AN OFFSHORE WIND TURBINE, WAVE-INDUCED MOTION COMPENSATED PILE HOLDING SYSTEM, VESSEL, AND PILE HOLDER

(71) Applicant: ITREC B.V., Schiedam (NL)

(72) Inventors: Terence Willem August Vehmeijer, Schiedam (NL); Stefan Cornells Van Ruyven, Schiedam (NL); Joop Roodenburg, Schiedam (NL); Maarten Hugo Hooftman, Schiedam (NL)

(73) Assignee: ITREC B.V., Schiedam (NL)

( * ) Notice: Subject to any disclaimer, the term of this patent is extended or adjusted under 35 U.S.C. 154(b) by 0 days.

(21) Appl. No.: 16/472,470

(22) PCT Filed: Dec. 22, 2017

(86) PCT No.: PCT/NL2017/050877
§ 371 (c)(1),
(2) Date: Jun. 21, 2019

(87) PCT Pub. No.: WO2018/117846
PCT Pub. Date: Jun. 28, 2018

(65) Prior Publication Data
US 2020/0308796 A1    Oct. 1, 2020

(30) Foreign Application Priority Data

Dec. 23, 2016 (NL) .................................. NL2018066

(51) Int. Cl.
*E02D 13/04* (2006.01)
*F16L 1/20* (2006.01)
(Continued)

(52) U.S. Cl.
CPC ........... *E02D 13/04* (2013.01); *E02D 27/425* (2013.01); *F16L 1/207* (2013.01); *E02B 2017/0091* (2013.01)

(58) Field of Classification Search
CPC ........... E02D 13/04; F16L 1/207; F03D 13/25
See application file for complete search history.

(56) References Cited

U.S. PATENT DOCUMENTS

| 4,102,147 A | 7/1978 | Jansz |
| 10,221,050 B2 * | 3/2019 | Weterings ............... B66C 23/52 |

(Continued)

FOREIGN PATENT DOCUMENTS

| CN | 102660950 A | 9/2012 |
| EP | 2 557 232 A1 | 2/2013 |

(Continued)

OTHER PUBLICATIONS

Brunner; Wolfgang et al.; New Bauer Flydrill System Drilling Monopiles at Barrow Offshore Wind Farm, UK; Missouri University of Science and Technology (Year: 2008).*

(Continued)

*Primary Examiner* — Benjamin F Fiorello
(74) *Attorney, Agent, or Firm* — Birch, Stewart, Kolasch & Birch, LLP

(57) ABSTRACT

A method for installation of a pile adapted to support an offshore wind turbine in which the piles are transported horizontally, positioned in a pile holder, rotated to a vertical orientation while being held by the pile holder, and subsequently lowered into the water while being held by the pile holder. The installation vessel is in a floating condition, and the pile holder is compensated for wave-induced motion of the vessel to maintain a predetermined X-Y location independent of the wave-induced motion of the vessel. A pile (Continued)

holding system, a pile holder, and a vessel comprising a pile holding system are also disclosed.

20 Claims, 10 Drawing Sheets

(51) Int. Cl.
*E02D 27/42* (2006.01)
*E02B 17/00* (2006.01)

(56) References Cited

U.S. PATENT DOCUMENTS

| | | | | |
|---|---|---|---|---|
| 2002/0159839 | A1* | 10/2002 | Frijns | F16L 1/19 405/166 |
| 2010/0310319 | A1* | 12/2010 | Pionetti | B63B 35/03 405/166 |
| 2011/0236137 | A1* | 9/2011 | Legaignoux | F16L 1/19 405/158 |
| 2012/0195716 | A1* | 8/2012 | Nouwens | F16L 1/207 414/22.55 |
| 2017/0275845 | A1* | 9/2017 | Belder | E02D 7/02 |

FOREIGN PATENT DOCUMENTS

| | | |
|---|---|---|
| EP | 2 886 722 A1 | 6/2015 |
| JP | 60-126427 A | 7/1985 |
| JP | 62-21139 U | 2/1987 |
| JP | 2007-32017 A | 2/2007 |
| NL | 7512022 A | 4/1977 |

OTHER PUBLICATIONS

Dutch Search Report, issued in Priority Application No. 2018066, dated May 15, 2017.
International Search Report, issued in PCT/NL2017/050877, dated May 11, 2018.
Written Opinion of the International Searching Authority; issued in PCT/NL2017/050877, dated May 11, 2018.

* cited by examiner

METHOD FOR INSTALLATION OF A PILE ADAPTED TO SUPPORT AN OFFSHORE WIND TURBINE, WAVE-INDUCED MOTION COMPENSATED PILE HOLDING SYSTEM, VESSEL, AND PILE HOLDER

The invention relates to a method for installation of a pile adapted to support an offshore wind turbine. The invention further relates to a wave-induced motion compensated pile holding system, a vessel comprising such a pile holding system, and to a pile holder.

In a known method for installing an offshore wind turbine, the foundation, in the form of a pile, is installed first by driving the pile into the sea bottom after which the wind turbine is installed on the pile, either by installing the wind turbine at once as a whole or by assembling the wind turbine in parts on the pile.

There is a trend towards larger wind turbines and a desire to install offshore wind turbines at locations with larger water depths than currently encountered. Both result in larger and heavier foundations. Hence, it is expected that in the near future piles need to be installed that are larger than 100 meters, possibly 120 meters or larger. The weight of such piles may be larger than 1000 mt, possibly 1300 mt or above.

Installation of piles is currently done using jack-up type vessel in which legs are lowered into the water to lift the vessel at least partially out of the water so that waves have a limited or minimal effect on the vessel. However, a drawback of such a jack-up type vessel is that it takes a lot of time to lower the legs and to lift the vessel out of the water and to go through the reverse process after installation of the pile.

It is therefore an object of the invention to provide a faster method to install a pile adapted to support an offshore wind turbine.

This object is achieved by providing a method for installation of a pile adapted to support an offshore wind turbine, comprising the following steps:
 a. transporting a pile in a horizontal orientation to an offshore installation site;
 b. positioning the pile in a pile holder on an installation vessel while being in a horizontal orientation parallel to a longitudinal axis of the vessel, wherein the pile holder engages with a circumference of the pile at a lower side thereof to hold the pile in order to limit movement of the lower side of the pile in a direction perpendicular to a longitudinal axis of the pile, and wherein the pile holder engages with a lower end of the pile in order to limit movement of the pile in a direction parallel to the longitudinal axis of the pile;
 c. lifting an upper end portion of the pile with the lower side in the pile holder thereby rotating the pile from a horizontal orientation to a vertical orientation about a substantially horizontal rotation axis perpendicular to the longitudinal axis of the vessel, wherein after rotating the pile from the horizontal orientation to the vertical orientation the pile is located outside the contour of the vessel seen from above to be lowered into the water;
 d. disengaging the pile holder from the lower end of the pile; and
 e. lowering the pile into the water while being held by the pile holder,
wherein during steps b. to e. the vessel is in a floating condition, and wherein during step e. the pile holder is compensated for wave-induced motion of the vessel to maintain a predetermined X-Y location independent of the wave-induced motion of the vessel.

The invention is based on the insight that installation of the pile while keeping the vessel in floating condition, thereby obviating the need of lowering legs, will result in a huge increase of speed of the installation method. This insight is not obvious as it introduces the problem of wave-induced motion of the vessel. This problem is partially solved by compensating the pile holder for wave-induced motion of the vessel to maintain a predetermined X-Y location independent of the wave-induced motion of the vessel during lowering of the pile. However, the inventors have further realized that motions of the vessel caused by handling of the pile prior to lowering the pile into the water and introducing a pile into the pile holder while being confronted with vessel motions may pose a further problem. Therefore, the method also allows to upend the pile with the pile already being positioned in the pile holder and with the pile initially being oriented parallel to the longitudinal axis of the vessel. When the pile is then upended about a rotation axis perpendicular to the longitudinal axis of the vessel, e.g. over the stern of the vessel, the effect of the weight shift of the pile on the vessel motion is minimal.

In an embodiment, the installation vessel also carries out step a. of the method, namely transporting a pile in a horizontal orientation to an offshore installation site. However, it is also possible that the pile is transported by a separate vessel or barge.

In an embodiment, step b. (positioning the pile in the pile holder) and/or step c. (lifting an upper end portion of the pile) are carried out by a crane on the installation vessel. In an embodiment, the pile holder is mounted on the vessel to rotate relative to the vessel about the horizontal rotation axis between a receiving position to receive a horizontal orientation and a lowering position in which the pile can be lowered into the water while being in a substantially vertical orientation, wherein in step b. the pile holder is in the receiving position, and wherein in step c. the pile holder is moved along with the pile to the lowering position.

In an embodiment, the pile holder comprises a pile support to engage with the lower end of the pile in order to limit movement of the pile in a direction parallel to the longitudinal axis of the pile, wherein step d., disengaging the pile holder from the lower end of the pile, comprises the steps:
 d1. lifting the pile from the pile support; and
 d2. moving the pile support out of the way in a direction perpendicular to the longitudinal axis of the pile.

In an embodiment, the pile holder comprises a pile support to engage with the lower end of the pile in order to limit movement of the pile in a direction parallel to the longitudinal axis of the pile, wherein step d., disengaging the pile holder from the lower end of the pile, comprises the steps:
 d1. moving the pile support away from the pile in a direction parallel to the longitudinal axis of the pile; and
 d2. moving the pile support out of the way in a direction perpendicular to the longitudinal axis of the pile.

In an embodiment, step e., lowering the pile in to the water by being held by the pile holder, comprises the steps:
 e1. lowering the pile until the pile reaches the sea bottom and passive lowering due to gravity stops;
 e2. actively driving the pile deeper into the sea bottom by applying downwardly directed forces to the upper end portion of the pile.

Preferably, step e1. is carried out by the crane on the installation vessel, wherein more preferably during at least a part, e.g. the last part, of the lowering in step e1. the upper end portion of the pile is compensated for wave-induced motion of the vessel to maintain a predetermined X-Y location independent of the wave-induced motion of the vessel.

Preferably during at least a part of the lowering in step e1., the pile is compensated for wave-induced motion of the vessel to maintain a predetermined Z location independent of the wave-induced motion of the vessel. This may alternatively be referred to as heave compensation.

In an embodiment, the crane on the installation vessel is arranged at the stern of the installation vessel and aligned with the centre of gravity of the installation vessel, and wherein the pile holder is arranged at the stern of the installation vessel next to the crane. In an embodiment, in step c., lifting an upper end portion of the pile thereby rotating the pile from a horizontal to a vertical orientation, it is prevented that the center of mass of the pile unintentionally continues its rotation to some extent after being vertically oriented, thereby toppling forwards with its upper end portion directed horizontally away from the vessel.

The invention also relates to a wave-induced motion compensated pile holding system to be mounted on a vessel, e.g. for installation of a pile adapted to support an offshore wind turbine, comprising:
a base frame to be mounted on the vessel;
a support frame arranged above the base frame at a distance thereof;
a support system for moveably supporting the support frame from the base frame;
an active motion compensated actuation system for moving the support frame relative to the base frame;
a control unit; and
a pile holder mounted on the support frame,
wherein the support system comprises at least three vertical beams extending between the base frame and the support frame, wherein the beams are equal in length, wherein one end of each beam is hingedly connected to hinge about two orthogonal hinge axes relative to the base structure, and wherein an opposite end of each beam is hingedly connected to hinge about two orthogonal hinge axes relative to the moveable structure, such that the support frame is able to move parallel to the base frame in two orthogonal horizontal directions,
wherein the actuation system comprises a first actuator to move the support frame such that the ends of the beams hinge about one of the two hinge axes, and a second actuator to move the moveable structure such that the ends of the beams hinge about the other one of the two hinge axes,
wherein the pile holder comprises a plurality of rollers to engage with a pile to hold the pile and to allow the pile to move in a direction parallel to the longitudinal axis of the pile relative to the pile holder,
and wherein the control unit provides an active wave-induced motion compensation mode in which the actuation system is operated to maintain a predetermined X-Y location of the pile holder independent of the wave-induced motion of the vessel.

An advantage of the pile holding system according to the invention is that the support system is configured such that during X-Y movement of the support frame relative to the base frame, the beams rotate relative to the support frame and base frame and no sliding or skidding motion is present. As a result thereof, the support frame can be moved relatively quickly as allowed for wave-induced motion compensation while wear and heat generation are limited.

In an embodiment, the pile holder is rotatable about a substantially horizontal rotation axis relative to the support frame between a horizontal orientation, in which the pile holder is able to hold a pile in a substantially vertical orientation, and a vertical orientation. The vertical orientation may be used to retract the pile holder, e.g. so that the pile holder does not extend or minimally extends beyond the contour of the vessel. However, the vertical orientation may also be used to hold a pile in a substantially horizontal orientation. The horizontal orientation of the pile holder corresponds to the lowering orientation described above in relation to the method according to the invention, and the vertical orientation of the pile holder corresponds to the receiving orientation described above in relation to the method according to the invention.

In an embodiment, the support system comprises four vertical beams extending between the base frame and the support frame.

In an embodiment, the first actuator and/or second actuator are configured to apply forces between vertical beams. Preferably, the first and/or second actuator comprises one, two or more hydraulic cylinders.

In an embodiment, the pile holder comprises:
a base structure;
two arms provided at opposite ends of the base structure;
a separate jaw per arm; and
a driving mechanism,
wherein the base structure is mounted on the support frame,
wherein the arms are pivotally mounted to the base structure about respective arm pivot axes,
wherein a jaw is pivotally mounted to a respective arm about a respective jaw pivot axis,
wherein a jaw provides two distinct pile engaging portions including rollers, and wherein the driving mechanism is operable on the two arms to move the arms about the arm pivot axes between an open position for receiving a pile and a closed position in which the pile engaging portions of the jaws can engage with a pile.

In an embodiment, the base structure is rotatably mounted on the support frame to allow the pile holder to be rotated about the substantially horizontal rotation axis.

In an embodiment the pile holder comprises one or more actuators, e.g. one or more hydraulic cylinders, e.g. two hydraulic cylinders, that are arranged between the support frame and the base structure to move the base structure, i.e. the pile holder, between the vertical and horizontal orientation. As a result thereof, the pile holder can be retracted when not in use and/or the pile holder can be used to upend a pile.

In an embodiment, the system is equipped with a toppling prevention system to prevent that, when rotating a pile from a horizontal to a vertical orientation using the pile holding system, it is prevented that the pile assumes an orientation in which the center of mass thereof moves forwardly in respect to the vertical orientation thereof—that is, in which the pile topples forwards with respect to the vertical orientation thereof, with its upper end portion directed horizontally away from the vessel. This may for instance be established by using one or more actuators, e.g. hydraulic cylinders, which are adapted to brake a movement of the pile holder and the pile held therein in this direction. Preferably, for this purpose the one or more actuators, e.g. hydraulic cylinders are used which are provided for moving the base structure, i.e. the pile holder, between the vertical and horizontal orientation. Alternatively, cables may be used, adapted to brake a movement of the pile holder and the pile held therein in this direction.

The invention further relates to a vessel comprising a pile holding system according to the invention, wherein the base frame of the pile holding system is mounted on the vessel.

In an embodiment, the pile holding system is arranged at a stern of the vessel to hold a pile outside the contour of the vessel seen from above at a stern side of the vessel.

In an embodiment, the vessel further comprises a crane to handle a pile, wherein the crane is arranged at a stern of the vessel in line with a centre of gravity of the vessel.

In an embodiment, the pile holding system is arranged next to the crane.

In an embodiment, the vessel further comprises a storage location at a stern of the vessel at a side of the crane opposite to the side where the pile holding system is arranged, which storage location allows to store a pile driving mechanism to drive a pile into a sea bottom.

In an embodiment, the vessel comprises deck space to store piles in a horizontal orientation parallel to the longitudinal axis of the vessel.

In an embodiment, the vessel is suitable to carry out the method according to the invention.

The invention also relates to a pile holder for holding a pile, comprising:
a base structure;
two arms provided at opposite ends of the base structure;
a separate jaw per arm; and
a driving mechanism,
wherein the arms are pivotally mounted to the base structure about respective arm pivot axes,
wherein a jaw is pivotally mounted to a respective arm about a respective jaw pivot axis,
wherein a jaw provides two distinct pile engaging portions including rollers,
and wherein the driving mechanism is operable on the two arms to move the arms about the arm pivot axes between an open position for receiving a pile and a closed position in which the pile engaging portions of the jaws can engage with a pile.

In an embodiment, a kinematic linkage is provided for each jaw that is configured to cause movement of the jaw during and as a result of movement of the respective arm.

In an embodiment, each kinematic linkage comprises a beam hingedly connected to both the jaw and the base structure.

In an embodiment, the arms have a fork shape, and wherein a jaw is pivotally mounted in between the respective fork-shaped arm.

In an embodiment, the pile holder is configured such that the pile engaging portion that is closest to the base structure can be received in the respective fork-shaped arm in the open position of the arms.

In an embodiment, the pile engaging portions include a set of rollers, e.g. two or more rollers per pile engaging portion.

The rollers of the pile engaging portions are rotatable to allow a pile held by the pile holder to move in a direction parallel to the longitudinal axis of the pile relative to the pile holder.

In an embodiment, the pile engaging portions as a whole are pivotable about a pivot axis extending in a direction parallel to the longitudinal axis of a pile held by the pile holder to allow the pile engaging portion to adapt itself to the outer contour of the pile, which makes it easier to handle piles with different diameters.

The present invention also relates to a pile holder comprising:
a base structure, e.g. adapted to be mounted to a support frame as described herein, e.g. to be pivotally mounted to the support frame to pivot relative to the support frame about base pivot axis between a substantially vertical orientation and a substantially horizontal orientation,
an annular structure configured to extent about a passage for a pile to be handled by the pipe holder, the annular structure being supported by the base frame or the base frame structure forming a section of the annular structure,
wherein the annular structure comprises two semi-circular jaws, each pivotally connected at an inner end thereof and pivotal about a pivot axis between a closed position, wherein outer ends of the jaws join up, and an opened position,
wherein the annular structure is provided with a circular support track structure that carries multiple pile engaging devices, e.g. with pile guiding rollers, e.g. four or more, here six, of such devices,
wherein, preferably, one or more, e.g. all, of the pile engaging devices are movable along the circular support track structure, at least over an arc segment of the circle, so as to allow for adaptation of the angular position of the pile engaging devices relative to the passage for the pile.

In an embodiment each pile engaging device carries one or more, e.g. a pair of two, pile guiding rollers in a movable manner to allow for adjustment of the radial position of the rollers relative to the passage for the pile. For example each pile engaging device comprises a suspension arm that is pivotal about a horizontal axis, here as preferred from a top end of the arm, relative to a chassis of the device that is supported on the track structure.

In an embodiment a suspension arm actuator, e.g. a hydraulic cylinder, is provided between the chassis and the arm to adjust the radial position of the roller(s).

In an embodiment each chassis here is provided with a motorized drive adapted to move the chassis along, possibly a section of, the circular track structure so as to adjust the angular position of the device.

It will be apparent to the skilled person that features and embodiments described in relation to one device, system, vessel, or method can also be applied to other described devices, systems, vessels or methods, where applicable. For instance, the features and embodiments described in relation to the pile holder according to the invention can also be applied to the method, vessel and pile holding system as this method, vessel and system also include a pile holder.

The invention will now be described in a non-limiting way by reference to the accompanying drawings in which like parts are indicated by like reference symbols, and in which:

FIG. 1 schematically depicts a perspective front view of a wave-induced motion compensated pile holding system according to an embodiment of the invention with the arms of the pile holder in the open position;

Figure 13:
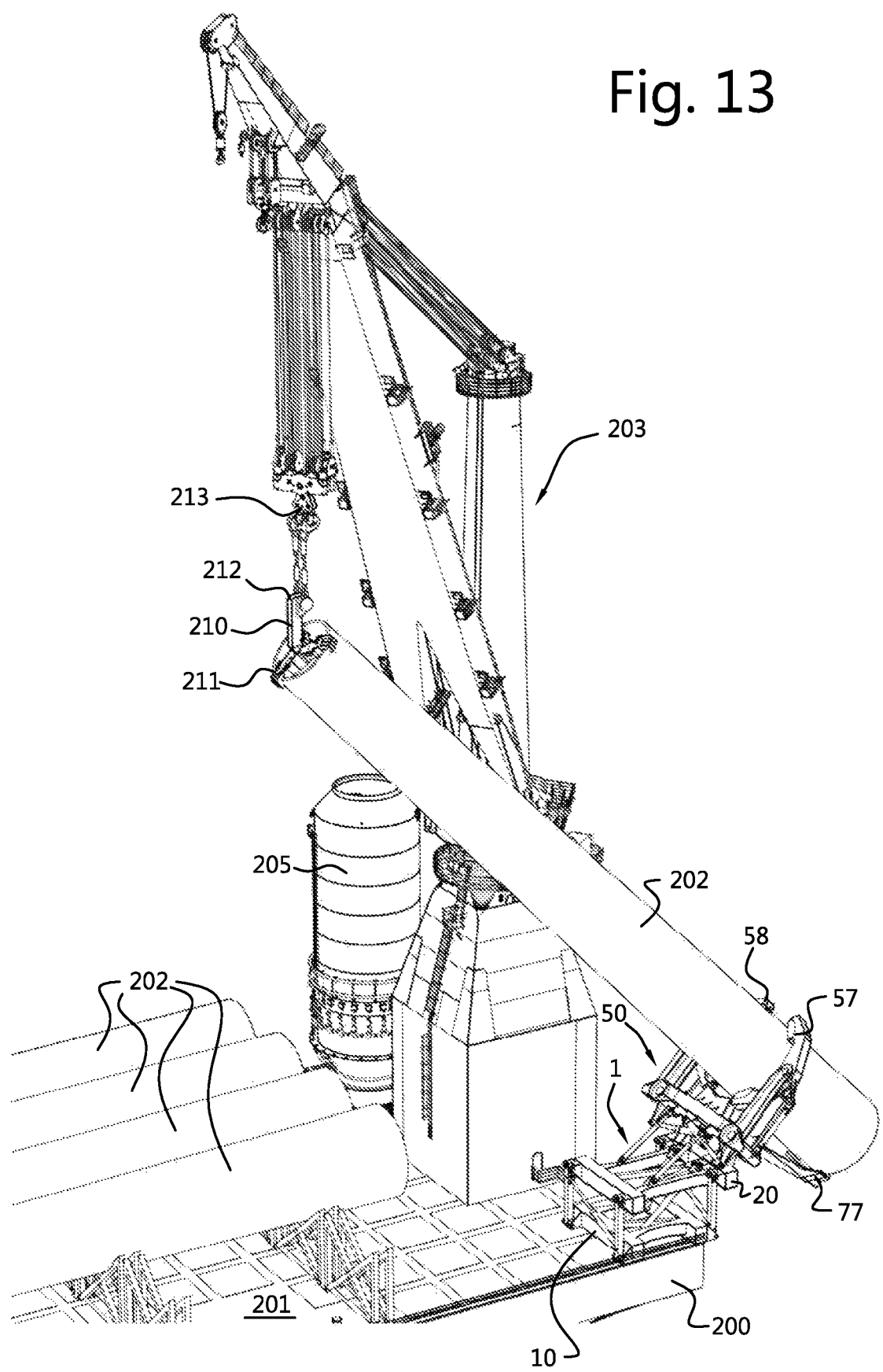
FIG. 13 depicts a vessel equipped with the pile holding system of FIG. 1 during upending of a pile.
Figure 14:
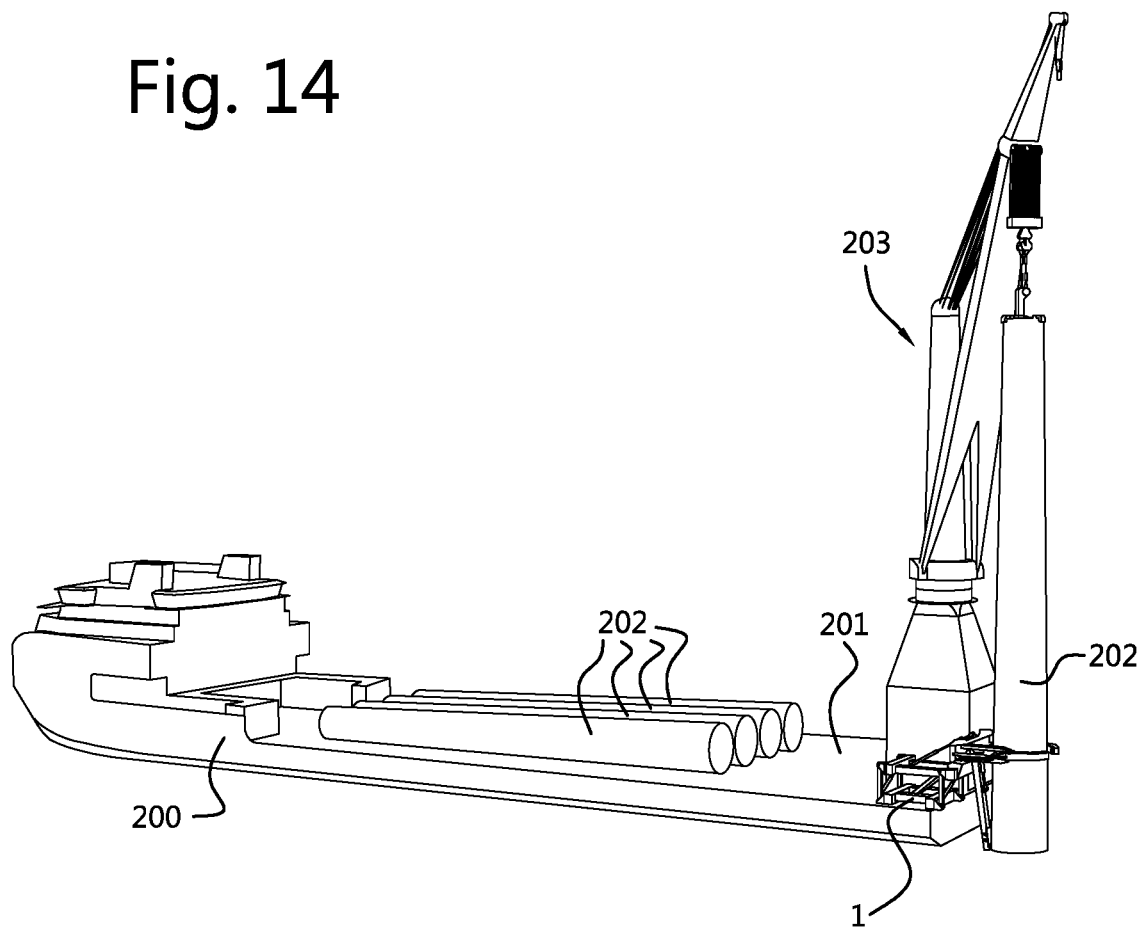
FIG. 14 depicts the vessel of FIG. 13 with the pile in a substantially vertical orientation.

FIGS. 1-7 depict a pile holding system 1 according to an embodiment of the invention. The pile holding system comprises a base frame 10 to be mounted on a vessel as depicted in FIGS. 13 and 14.

In an embodiment, the base frame 10 is integrated in or with a deck of the vessel. In another embodiment, the base frame may be moveable, e.g. slidable or skiddable, relative to the deck, so that the pile holding system may for instance be moveable between a retracted position in which the pile holding system is arranged inside a contour of the vessel seen from above, and an operational position in which the pile holding system is arranged at least partially outside the contour of the vessel seen from above.

The pile holding system 1 further comprises a support frame 20 that is moveably supported by a support system at a distance from the base frame 10. In this embodiment, the support system comprises four vertical beams 31, 32, 33, 34 which are equal in length and extending between the base frame 10 and the support frame 20. In FIGS. 1-7, the beams 31, 32, 33, 34 extend mainly in the Z-direction.

One end of each beam 31, 32, 33, 34 is connected to the base frame 10 and the respective opposite end is connected to the support frame 20. The ends of the beams 31, 32, 33, 34 are connected to the respective base frame 10 and support frame 20 using a universal joint with a pair of hinges located close together, oriented at 90 degrees to each other, and connected by an intermediate member. The universal joint may alternatively be referred to as cardan joint.

Hence, each beam is able to hinge about a first hinge axis extending in X-direction relative to the base frame, a second hinge axis extending in Y-direction relative to the base frame, a third hinge axis extending in X-direction relative to the support frame and a fourth hinge axis extending in Y-direction relative to the support frame. For simplicity reasons, the following table indicates the reference symbols used in the drawings.

TABLE 1

| | reference symbols for hinge axes | | | |
|---|---|---|---|---|
| Beam | First hinge axis | Second hinge axis | Third hinge axis | Fourth hinge axis |
| 31 | 31.1 | 31.2 | 31.3 | 31.4 |
| 32 | 32.1 | 32.2 | 32.3 | 32.4 |
| 33 | 33.1 | 33.2 | 33.3 | 33.4 |
| 34 | 34.1 | 34.2 | 34.3 | 34.4 |

Hence, the first hinge axis is orthogonal to the second hinge axis and parallel to the third hinge axis. The fourth hinge axis is orthogonal to the third hinge axis and parallel to the second hinge axis. As a result, the support frame 20 is able to be moved parallel to the base frame 10 in both X- and Y-direction, i.e. in an X-Y plane.

In order to move the support frame 20 relative to the base frame 10 in the X-Y plane, an active motion compensated actuation system is provided. In this embodiment, the actuation system comprises two first actuators, in this case two first hydraulic cylinders 41, to move the support frame 20 in the Y-direction relative to the base frame 10 by pivoting the beams about their respective first and third hinge axes. The actuation system further comprises two second actuators, in this case two second hydraulic cylinders 42, to move the support frame 20 in the X-direction relative to the base frame 10 by pivoting the beams about their relative second and fourth pivot axes.

In the shown embodiment, the first actuators 41 are arranged between the base frame 10 and the support frame 20, so that the first actuators 41 are also connected to the respective base frame 10 and the support frame 20 using universal joints similar as the beams, so that the support frame can move relative to the base frame without being interfered by the first actuators. The position of the support frame 20 in Y-direction relative to the base frame 10 is then set by the length of the first actuators 41.

In the shown embodiment, one of the second actuators 42 is arranged between the beams 31 and 34, and the other one of the second actuators 42 is arranged between the beams 32 and 33. An advantage thereof is that the second actuators only need to be hingedly connected to the beams about hinge axes that are parallel to the second and fourth hinge axes of the beams. The position of the support frame 20 in X-direction relative to the base frame 10 is then set by the length of the second actuators 42.

Figure 2:
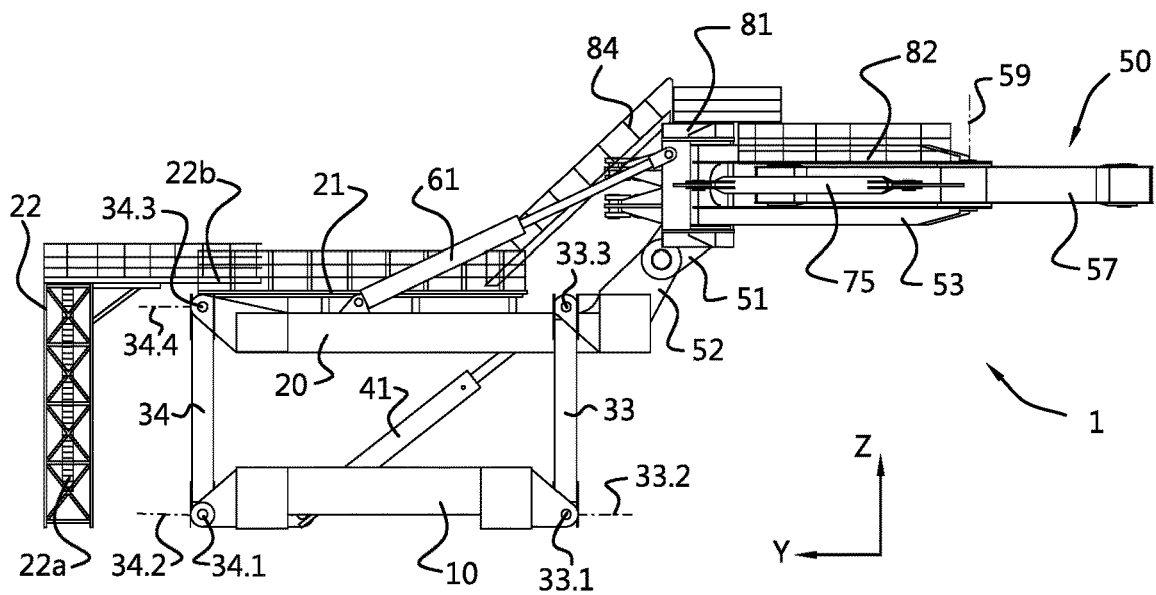
FIG. 2 depicts a side view of the pile holding system of FIG. 1 in a substantially horizontal orientation of the pile holder.
Figure 3:
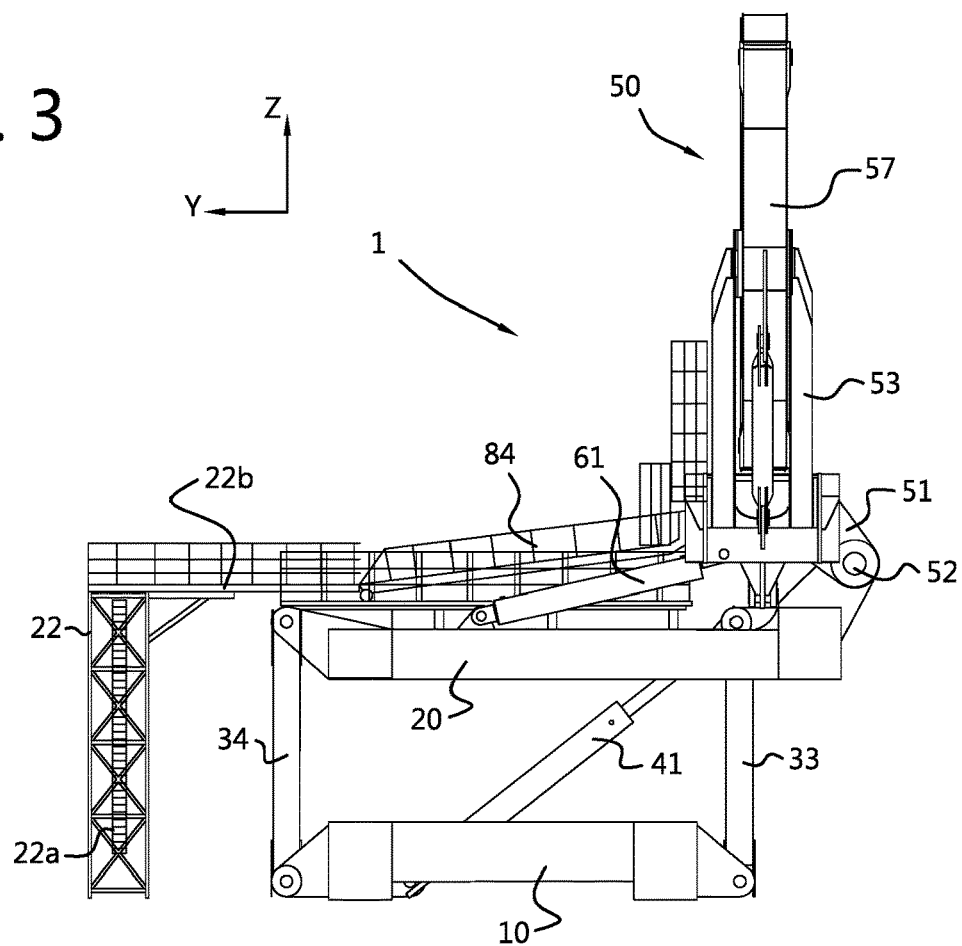
FIG. 3 depicts a side view of the pile holding system of FIG. 1 in a substantially vertical orientation of the pile holder.
Figure 4:
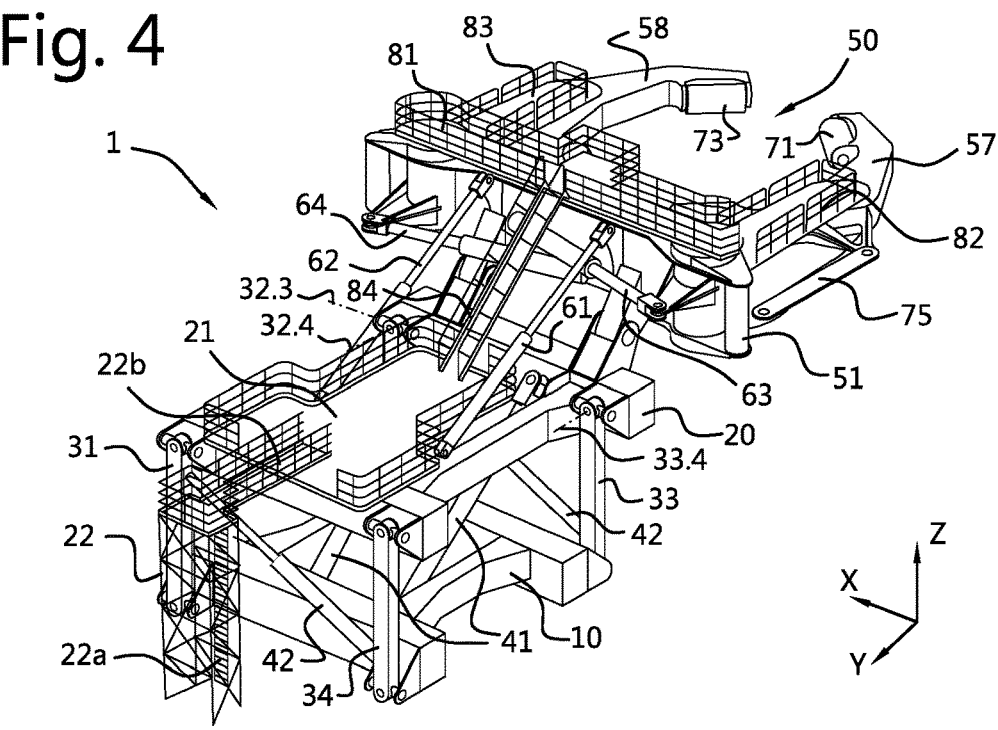
FIG. 4 depicts a perspective rear view of the pile holding system of FIG. 1 with the arms of the pile holder in the closed position.

As shown in FIGS. 2-4, the support frame 20 may be provided with a platform 21 allowing personnel to walk over the support frame 20. The platform 21 may be accessible via a construction 22 comprising a stair or ladder 22a between deck level and platform 21 level and a gangway 22b between the stair or ladder 22a an the platform 21. In this embodiment, the gangway 22b is suspended just above the platform 21 without being fixed to the 20 platform 21, so that the platform 21 can freely move below the gangway in the X-Y plane along with the support frame 20.

The system 1 further comprises a pile holder 50 mounted on the support frame 20, which pile holder 50 is configured to engage with a pile in order to hold the pile and to allow the pile to move in a direction parallel to a longitudinal axis of the pile relative to the pile holder 50 as will be explained below in more detail.

The pile holder 50 comprises a base structure 51 mounted to the support frame 20. In this embodiment, the base structure 51 is pivotably mounted to the support frame 20 to pivot relative to the support frame 20 about base pivot axis 52 between a substantially vertical orientation as depicted in FIG. 3 and a substantially horizontal orientation as depicted in FIGS. 1, 2, 4-7.

The pile holder 50 comprises two actuators, in this case two hydraulic cylinders 61, 62, that are arranged between the support frame 20 and the base structure 51 to move the base structure 51, i.e. the pile holder 50, between the vertical and horizontal orientation. As a result thereof, the pile holder can be retracted when not in use and/or the pile holder can be used to upend a pile as will be explained later in more detail.

In an embodiment, cylinders 61 and 62 are adapted to brake a toppling movement of the pile holder and the pile held therein, when rotating a pile from a horizontal to a vertical orientation using the pile holding system. This toppling movement being that, starting from the vertical orientation of the pile, the center of mass of the pile moves forwardly, away from the vessel—that is, wherein the pile topples with its upper end portion moving horizontally away from the vessel.

Figure 1:
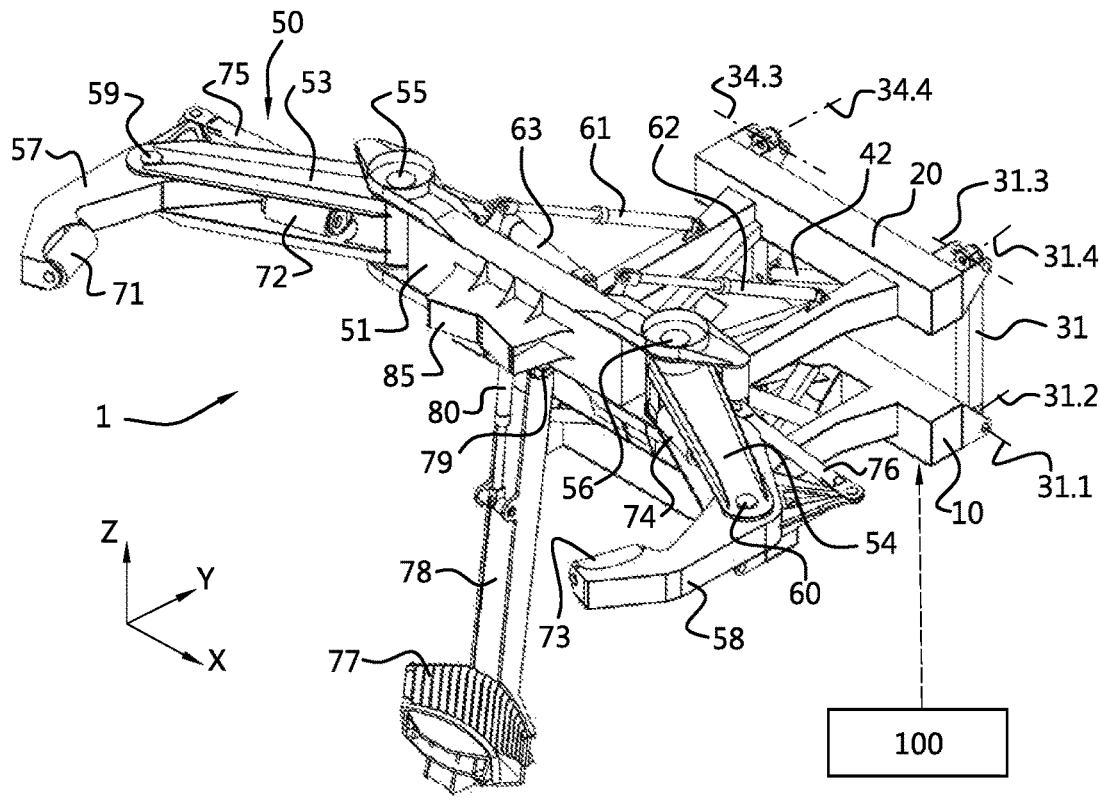
Figure 5:
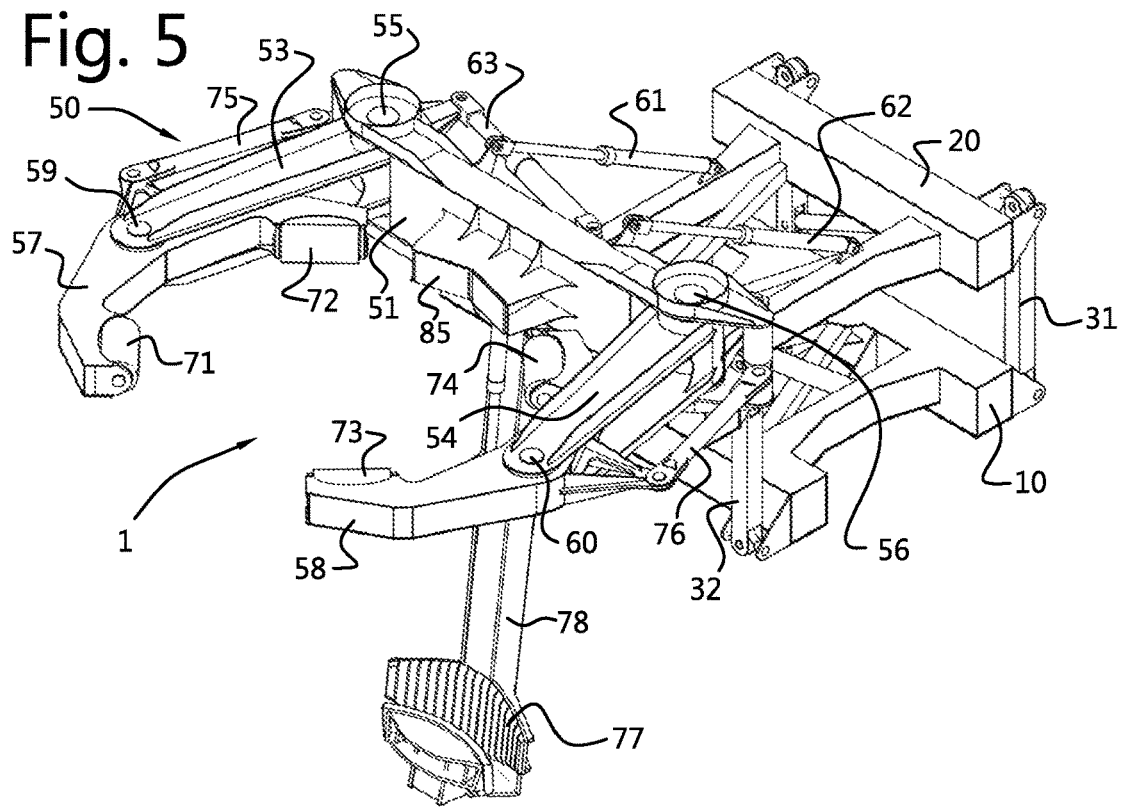
FIG. 5 depicts a perspective front view of the pile holding system of FIG. 1 with the arms of the pile holder in the closed position corresponding to a pile having a first diameter.
Figure 6:
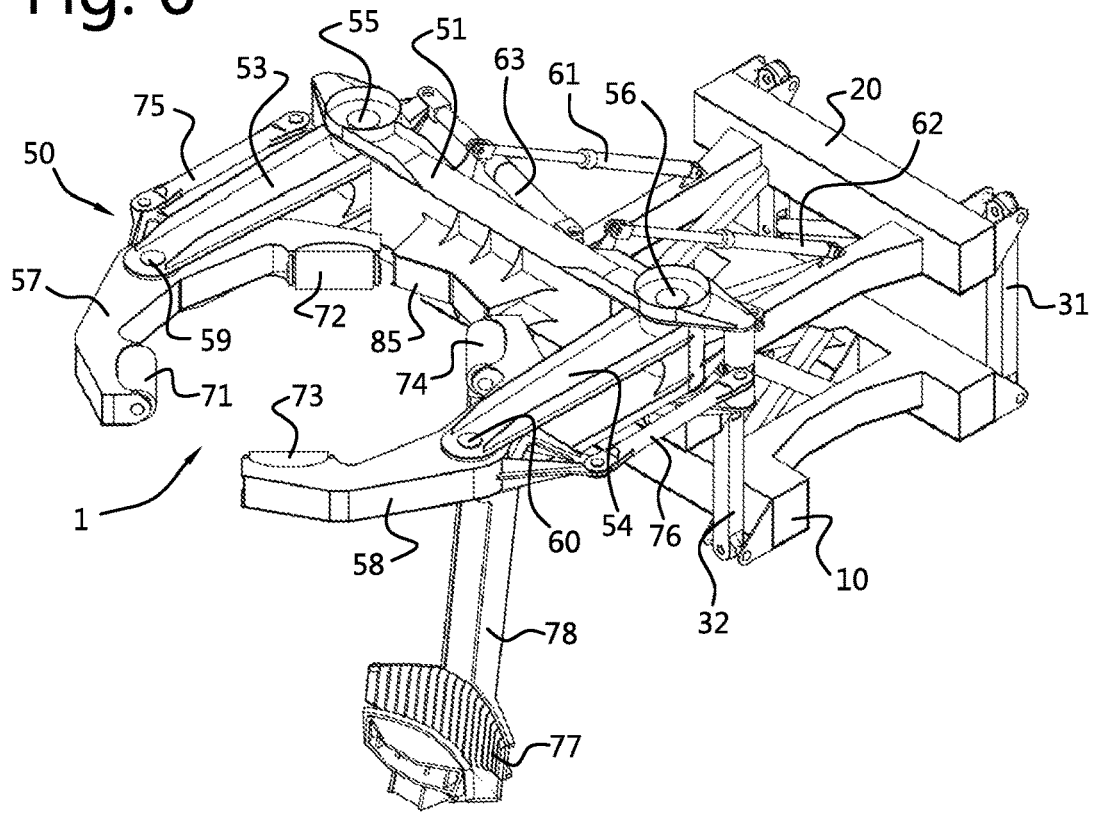
FIG. 6 depicts a perspective front view of the pile holding system of FIG. 1 with the arms of the pile holder in the closed position corresponding to a pile having a second diameter.
Figure 7:
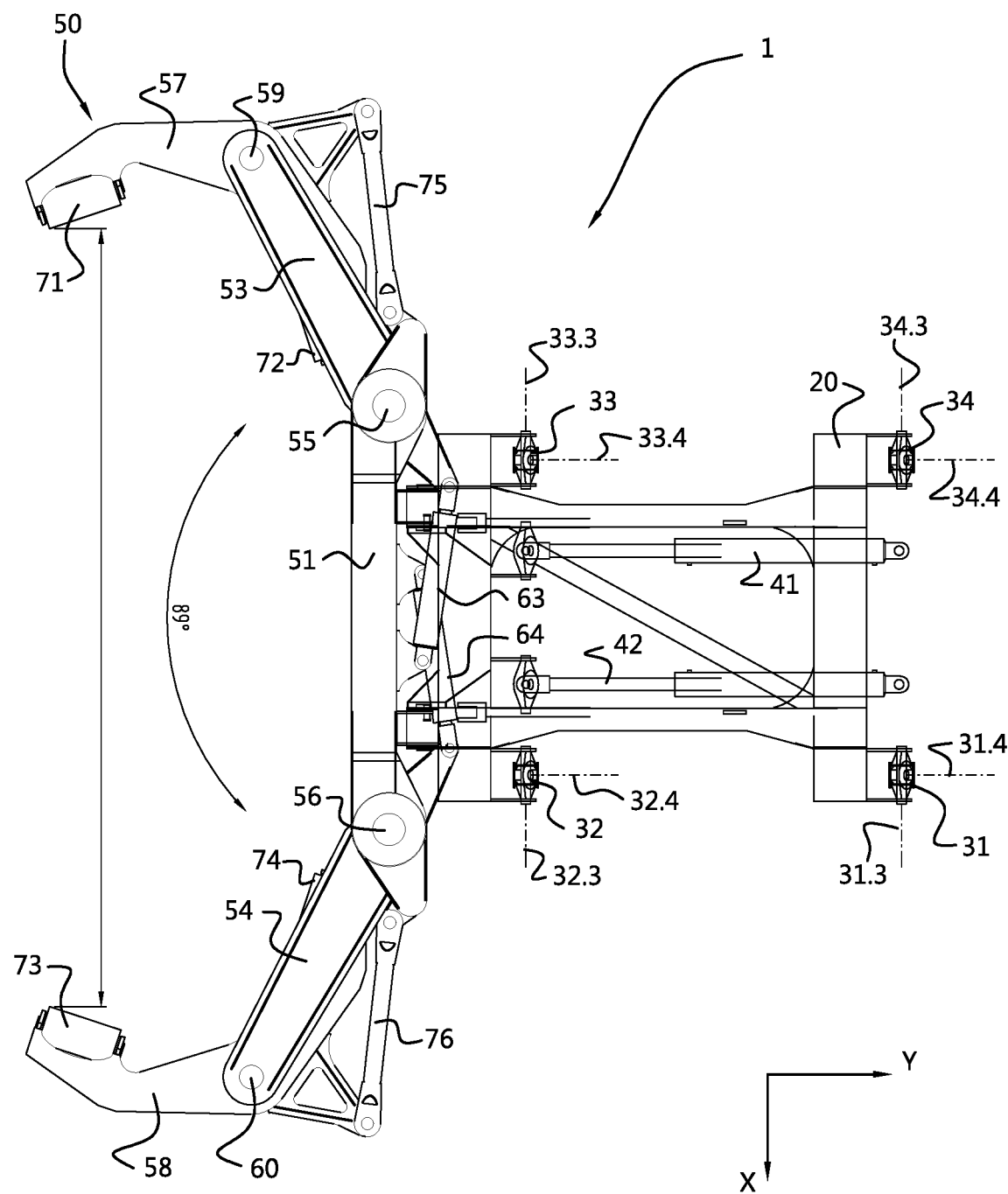
FIG. 7 depicts a top view of the pile holding system of FIG. 1 with the arms of the pile holder in the open position.

At each end of the base structure 51, a respective arm 53, 54 is provided. The arms 53, 54 are pivotably mounted to the base structure 51 to pivot relative to the base structure 51 about respective arm pivot axis 55, 56 between an open position as depicted in FIGS. 1, 3 and 7 and one or more closed positions as depicted in FIGS. 2 and 4-6.

The pile holder 51 comprises a driving mechanism that is operable on the two arms 53, 54 to move the arms about the arm pivot axes 55, 56 between the open position for receiving a pile and a closed position. In this embodiment, the driving mechanism comprises two hydraulic actuators 63, 64.

Each arm 53, 54 is provided with a respective jaw 57, 58. The jaw 57 is pivotably mounted to arm 53 to pivot relative to the arm 53 about a jaw pivot axis 59. The jaw 58 is pivotably mounted to arm 54 to pivot relative to the arm 54 about a jaw pivot axis 60.

Each jaw 57, 58 is provided with at least two distinct piling engaging portions 71, 72, 73, 74 in this embodiment in the form of single rollers.

Although it is possible to provide separate actuators to pivot the jaws 57, 58 about their respective jaw pivot axis 59, 60, the jaws 57, 58 are in this embodiment automatically moved and positioned by the driving mechanism 63, 64 moving and positioning the arms 53, 54 due to the provision of a kinematic linkage for each jaw 57, 58 that is configured to cause movement of the jaw during and as a result of movement of the respective arm.

In this embodiment, the kinematic linkage for jaw 57 comprises a beam 75 connecting the jaw 57 to the base structure 51. One end of beam 75 is hingeably connected to the jaw 57 at a distance from the jaw pivot axis 59 while the opposite end of beam 75 is hingeably connected to the base structure 51 at a distance from the arm pivot axis 55 thereby forming a four bar linkage consisting of (portions of) the base structure 51, the arm 53, the jaw 57 and the beam 75.

The kinematic linkage for jaw 58 comprises a similar beam 76 connecting the jaw 58 to the base structure 51. One end of beam 76 is hingeably connected to the jaw 58 at a distance from the jaw pivot axis 60 while the opposite end of beam 76 is hingeably connected to the base structure 51 at a distance from the arm pivot axis 56 thereby forming a four bar linkage consisting of (portions of) the base structure 51, the arm 54, the jaw 58 and the beam 76.

Hence, upon rotation of the arms 53, 54, the respective four bar linkages will cause the respective jaws 57, 58 to rotate relative to the arms 53, 54 about the jaw pivot axes 59, 60. An advantage of the kinematic linkages is that the jaws will face more towards each other during opening and closing of the pile holder compared to jaws that are fixed to the arms. This will improve the engagement and disengagement of the jaws with the pile. Further, more space is available to receive a pile in the open position as can be best seen in FIGS. 1 and 7. Due to the four bar linkage, the pile engaging portions 72 and 74 are retracted to lie almost entirely within the respective arms 53, 54. The arms 53, 54 are designed as forks with the respective jaw being arranged in between the forks to allow the free rotation of the jaw about the respective jaw pivot axis and to allow the pile engaging portions 72, 74 to be received in between the forks.

Another advantage of the four bar linkages may be that in at least one closed position there is a moving range of the arms 53, 54 around the at least one closed position allowing the pile holder to hold piles having a different diameter or allowing the pile holder to hold a pile having a varying diameter along its length in different locations while the longitudinal axis of the different piles or the varying diameter pile remains substantially at the same position relative to the base structure.

As an example, the arms 53, 54 are depicted in different positions. The open position is already described in relation to FIGS. 1, 3 and 7. FIGS. 5 and 6 depict two different closed positions, each for a different diameter. In FIG. 6, the jaws 57, 58 are closer to each other than in FIG. 5, so that the closed position of FIG. 6 allows to hold a smaller diameter pile or pile portion than the closed position of FIG. 5. FIG. 5 may also be an intermediate position 35 when moving from the closed position in FIG. 6 and the open position.

The pile holder 50 further comprises a pile support 77 arranged on a support beam 78 which is pivotably connected to the base structure 51 to pivot relative to the base structure 51 about a beam pivot axis 79. For simplicity reasons, the pile support 77 and support beam 78 are only shown in FIGS. 1, 5 and 6.

In order to move and position the support beam 78 about the beam pivot axis 79, an actuator, in this case a hydraulic cylinder 80, is provided between the base structure 51 and the support beam 78. The actuator 80 allows to move the pile support between an operational position in which the pile support is able to engage with a pile and a retracted position in which the pile support allows the free passage of a pile through the pile holder 50.

The pile support 77 is configured to engage with a lower end of a pile in the operational position in order to limit movement of the pile in a direction parallel to a longitudinal axis of the pile and preferably also in a direction perpendicular to the longitudinal axis of the pile. This allows the pile support to provide additional support to the pile during upending of the pile as will be explained below in more detail.

The pile holder 50 is further provided with a platform 81 on the base structure 51, a platform 82 on the arm 53, and a platform 83 on the arm 54 of the pile holder 50. This allows personnel to reach the pile holder, e.g. for inspection of the pile holder, but also for inspection of the pile in the pile holder.

A stair 84 is provided between platform 21 on the support frame 20 and the platform 81 on the base structure 51. It is further possible to get on the platforms 82 and 83 from the platform 81. At the platform 21 side of the stair 84, the stair 84 is supported from the platform by wheels and on the pile holder side the stair 84 is pivotally mounted to the base structure 51, so that when the pile holder is rotated towards the vertical orientation as depicted in FIG. 3, the stair 84 moves easily over the platform 21.

The base structure 51 of the pile holder 50 is further provided with a bumper 85, in this embodiment having a V-shape, allowing to engage with a pile when the arms are in the open position. The bumper 85 protects the base structure and may comprise resilient or spring-like components to absorb collision forces, but the bumper may additionally or alternatively be used as a temporary support for a pile when the pile holder is in a vertical orientation and a pile is introduced into the pile holder in a substantially horizontal position.

Once the arms of the pile holder are closed and the pile engaging portions engage with the pile, the bumper preferably disengages from the pile. In an embodiment, the bumper is moveable in a direction parallel to a plane spanned by the arms and jaws and perpendicular to the base structure thereby allowing to position the pile in between the arms and/or allowing to actively engage and disengage from the pile.

The bumper is for simplicity reasons not shown in every drawing, but can be clearly seen in FIGS. 1, 5 and 6.

The pile holding system 1 further comprises a control unit 100, which is schematically depicted in FIG. 1 only. The control unit 100 controls at least the first and second actuators 41, 42, but may, as in this embodiment, also control all other actuators shown in the drawings.

The control unit 100 provides an active wave-induced motion compensation mode in which the actuation system is operated to maintain a predetermined X-Y location of the pile holder 50 independent of the wave-induced motion of the vessel. This provides many advantages which will be described below in more detail.

FIGS. 8-12 depict a pile holding system 1 according to another embodiment of the invention. The pile holding system is similar to the pile holding system 1 of FIGS. 1-7 with the main difference that the jaws 57, 58 are embodied differently. Due to the similarity between the two embodiments, the identical or similar components are not described again below. Reference is made to the description related to FIGS. 1-7. The description below in relation to the FIGS. 8-12 therefore focuses on the differences between the two embodiments.

The jaws 57, 58 of the embodiment according to FIGS. 1-7 each comprise two fixed pile engaging portions 71, 72, 73, 74 in the form of single rollers. The jaws 57, 58 of the embodiment according to FIGS. 8-12 each comprise two swivelling pile engaging portions 71, 72, 73, 74 that can freely swivel about respective swivel axes 71c, 72c, 73c and 74c. Each pile engaging portion further comprises two rollers to engage with the pile. Pile engaging portion 71 comprises rollers 71a, 71b, pile engaging portion 72 comprises rollers 72a, 72b, pile engaging portion 73 comprises rollers 73a, 73b, and pile engaging portion 74 comprises rollers 74a, 74b.

Figure 8:
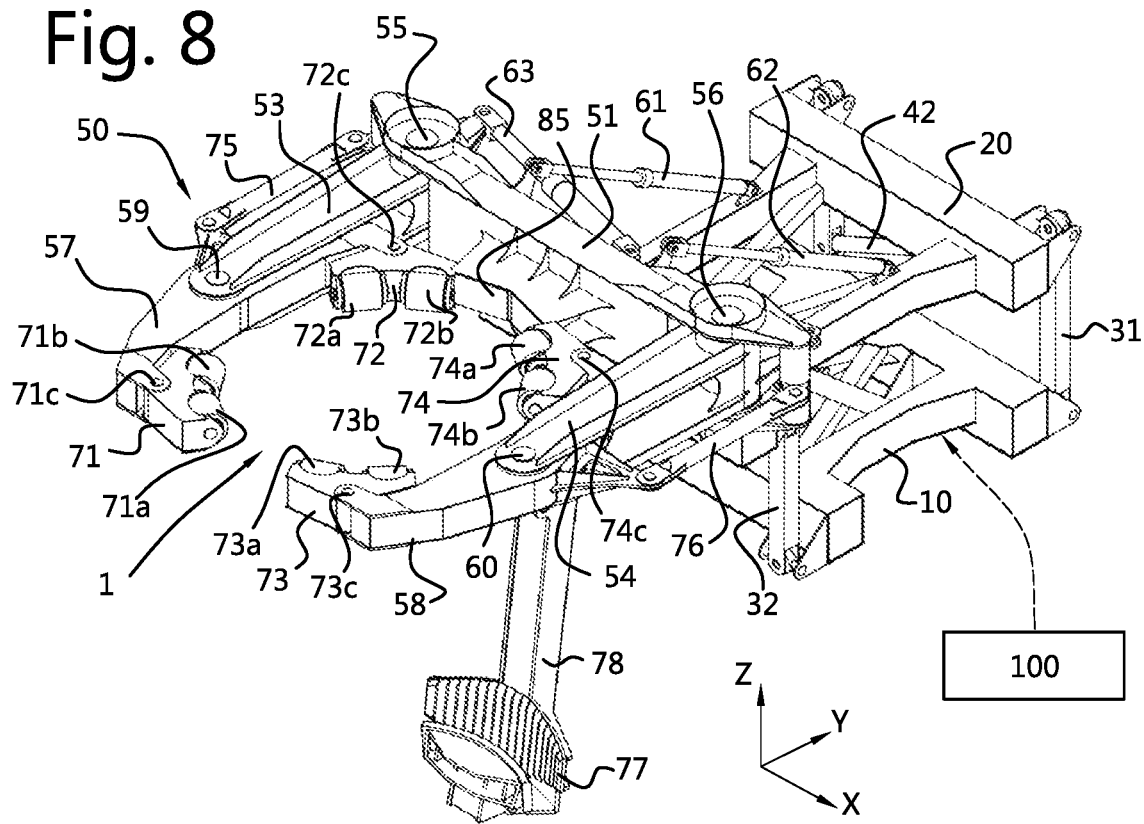
FIG. 8 depicts a perspective front view of a wave-induced motion compensated pile holding system according to another embodiment of the invention.

In FIG. 8, the support frame 20, and thus the pile holder 50, is in an equilibrium position. The equilibrium position can be defined as the position in which the beams 31-34 are perpendicular to plans spanned by the support frame 20 and the base frame 10.

Figure 9:
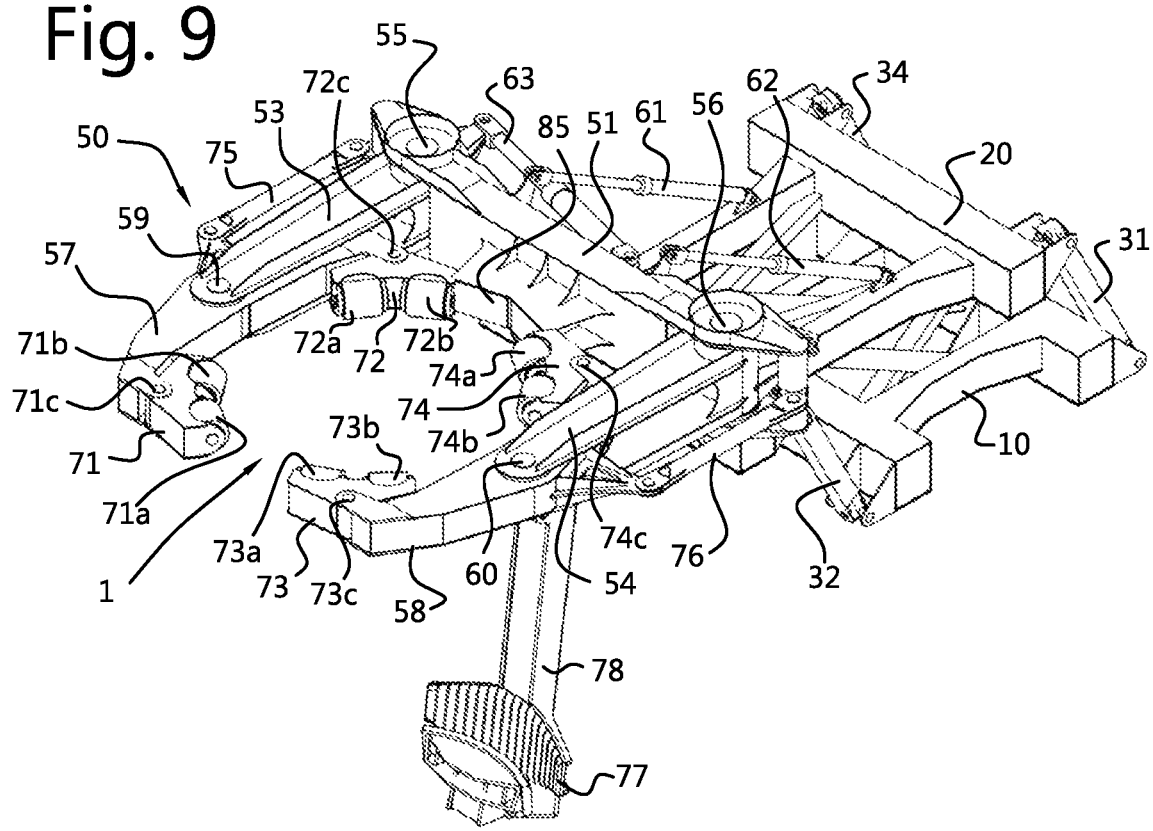
FIGS. 9-12 depicts a perspective front view of the pile holding system of FIG. 8 with the pile holder in four different positions relative to the base frame.
Figure 10:
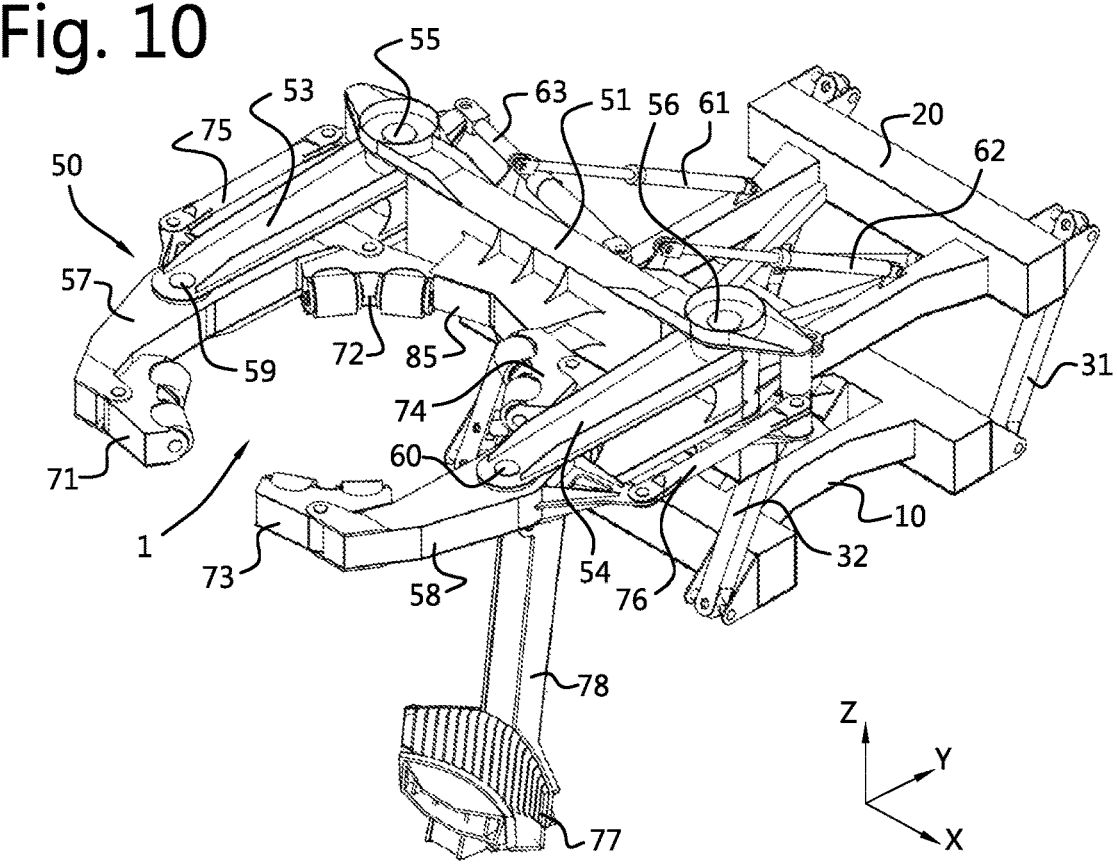
Figure 11:
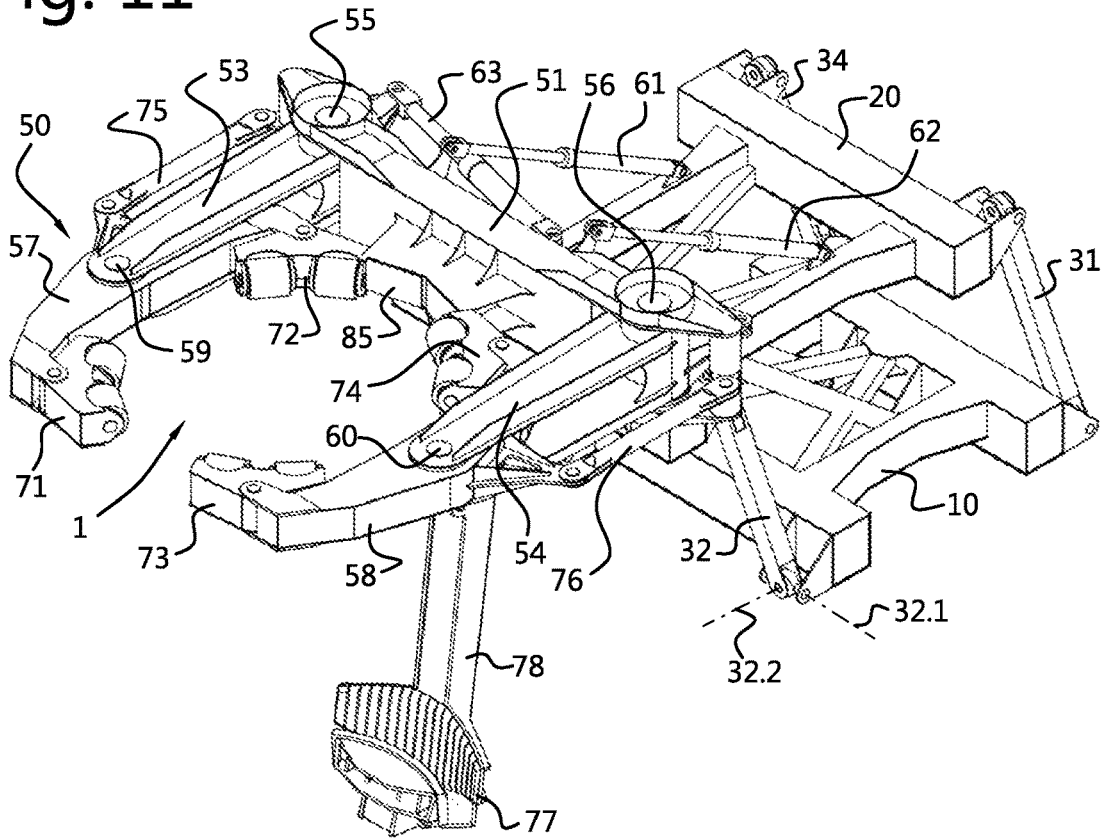
Figure 12:
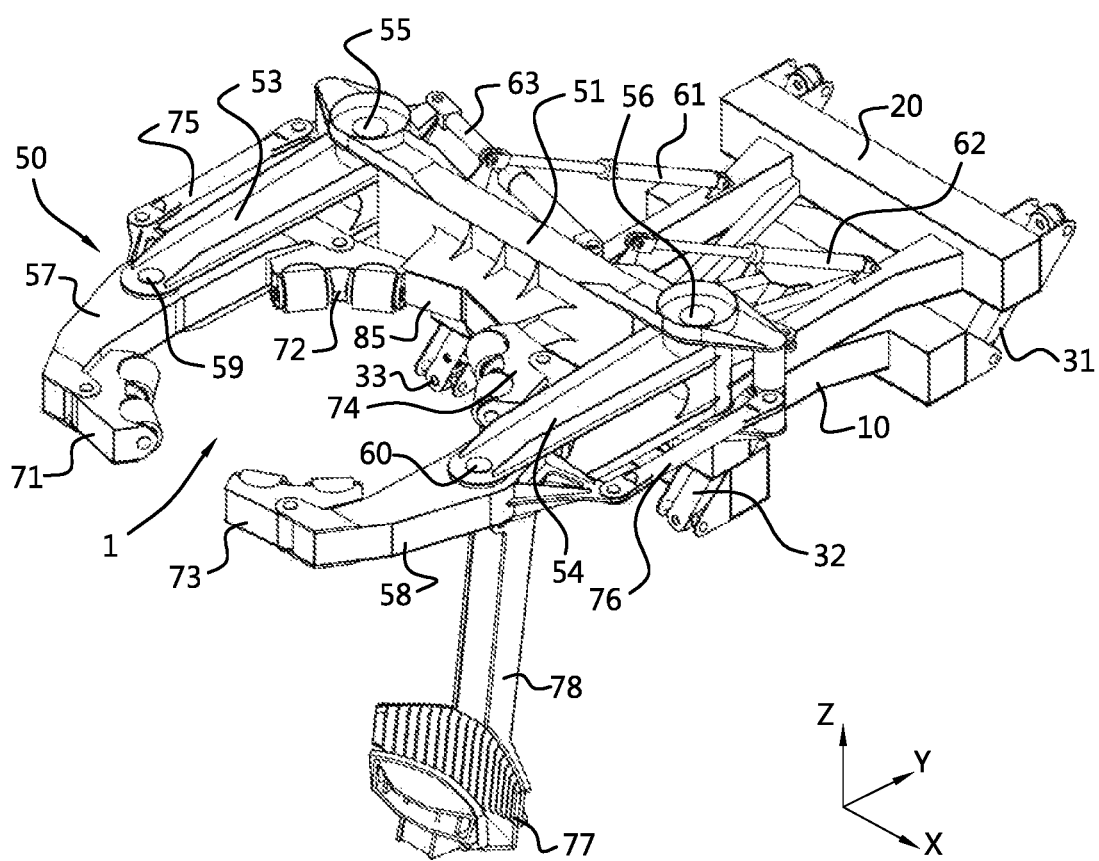

FIGS. 9-12 depict the moving possibilities. In FIG. 9, the first actuators 41 are fully extended thereby moving the support frame in a negative Y-direction relative to the equilibrium position. In FIG. 10, the first actuators 41 are fully retracted thereby moving the support frame in a positive Y-direction relative to the equilibrium position. In FIG. 11, the second actuators 42 are fully retracted thereby moving the support frame in a negative X-direction relative to the equilibrium position. In FIG. 12, the second actuators 42 are fully extended thereby moving the support frame in a positive X-direction relative to the equilibrium position.

The described moving possibilities and the equilibrium position also apply to the embodiment of FIGS. 1-7 and allows to move the support frame 20 in the X-Y plane thereby allowing the wave-induced motion compensation mode of the control unit.

The above pile holding systems 1 can be used in a method that will be described below by reference to FIGS. 13-14. The pile holding system 1 shown in FIGS. 13 and 14 is similar to the pile holding system 1 of FIGS. 1-7.

FIGS. 13 and 14 depict a vessel 200 with a deck 201. The deck 201 provides sufficient space to store, in this case, five piles 202 in a horizontal orientation. The piles 202 are stored such that their longitudinal axes are parallel to a longitudinal axis of the vessel 200.

In this embodiment, the vessel 200 is a monohull vessel, but alternatively, the vessel could be a semi-submersible. In a non-shown embodiment, the vessel is a jack-up type vessel in which legs can be lowered into the water to lift the vessel at least partially out of the water so that waves have a limited or minimal effect on the vessel. The vessel can then be used in floating condition when the weather and wave conditions are good and can be used in jack-up condition when the weather and wave conditions are bad.

At a stern of the vessel is provided a crane 203. The crane 203 is arranged in a centre of the deck 201 seen in transverse direction of the vessel 200 to be aligned with a centre of gravity of the vessel 200. On one side the pile holding system 1 is arranged and on an opposite side of the crane 203, a pile driving mechanism 205 is arranged at a corresponding storage location.

The pile holding system 1 is arranged such that the base pivot axis 52, which may alternatively be referred to as rotation axis 52, is oriented horizontally but perpendicular to the longitudinal axis of the vessel 200.

When the vessel 200 has sailed to an offshore installation site where a pile 202 needs to be installed into the sea bottom, a pile 202 is positioned in the pile holder 50 of the pile holding system 1 while the pile holder 50 is in the vertical position of FIG. 3, which may also be referred to as the receiving position as it allows to receive a pile in a horizontal orientation.

The arms 53, 54 of the pile holder 50 are moved to the open position and the pile 202 can be positioned in the pile holder 50 to rest on the bumper 85. The arms 53, 54 are then closed such that the pile engaging portions 71, 72, 73, 74 of the jaws 57, 58 engage with the circumference of the pile 202 at a lower side thereof. The pile is then preferably lifted from the bumper 85.

The pile support 77 on the pile holder 50 is also brought into the correct position and in this case using a translation of the pile 202 parallel to the longitudinal axis of the pile 202, the lower end of the pile 202 engages with the pile support 77.

As a result thereof, movement of the lower side of the pile 202 in a direction perpendicular to the longitudinal axis of the pile 202 and movement of the pile 202 in a direction parallel to the longitudinal axis of the pile 202 is limited.

The upper end of the pile 202 is then lifted using the crane 203 with the lower side in the pile holder 50 thereby rotating the pile 202 from a horizontal orientation to a vertical orientation as shown in FIG. 14. FIG. 13 shows the pile 202 in an intermediate oblique orientation between the horizontal orientation and the vertical orientation.

After rotating, the pile holder 50 is in the horizontal position, which may alternatively be referred to as lowering position, and the pile 202 is located outside the contour of the vessel 200, i.e. overboard, seen from above to be lowered into the water as can be seen in FIG. 14. The pipe holder 50 and the pile 202 are now in the stern side of the vessel 200.

Before lowering the pile 202 into the water, the lower end of the pile 202 needs to be disengaged from the pile support 77. The pile 202 is in that case lifted first after which the pile support 77 can be moved out of the way. The pile 202 can then be lowered into the water.

During the above operations, the vessel is preferably in floating condition, and during lowering the pile holder 50 is compensated for wave-induced motion of the vessel 200 to maintain a predetermined X-Y location independent of the wave-induced motion of the vessel 200 by operating the control unit 100 of the pile holding system 1 in wave-induced motion compensation mode.

When lowering the pile 202 into the water, the pile 202 is initially held by the crane 203 and gravity forces will initially drive the pile 202 into the sea bottom when the pile 202 reaches the sea bottom. When this stops, the crane 203 can be disengaged from the pile 202 and the pile driving mechanism 205 can be lifted by the crane 203 to be position on top of the pile 202 to actively drive the pile 202 deeper into the sea bottom by applying downwardly directed forces to the upper end portion of the pile 202.

When the pile is lowered into the water and suspended from the crane 203, the crane may be operated in wave-induced motion compensation mode so that the upper end of the pile 202 is compensated for wave-induced motion of the vessel to maintain a predetermined X-Y location independent of the wave-induced motion of the vessel. This allows to keep the pile 202 in a substantially vertical orientation during lowering.

Alternatively or additionally, the crane may be operated in wave-induced motion compensation mode so that the pile 202 is compensated for wave-induced motion of the vessel to maintain a predetermined Z location independent of the wave-induced motion of the vessel. This may also be referred to as heave compensation.

In order to lift the upper end of the pile 202 to rotate the pile from a horizontal orientation to a vertical orientation, the crane is provided with a pile clamping device 210 comprising a clamping part 211 to clamp the upper end of the pile 202 and a connecting part 212 allowing to connect the pile clamping device to a load connector 213 of the crane 203. The connecting part 212 is able to rotate freely relative to the clamping part 211 during lifting of the upper end, i.e. during rotating of the pile.

Figure 15:
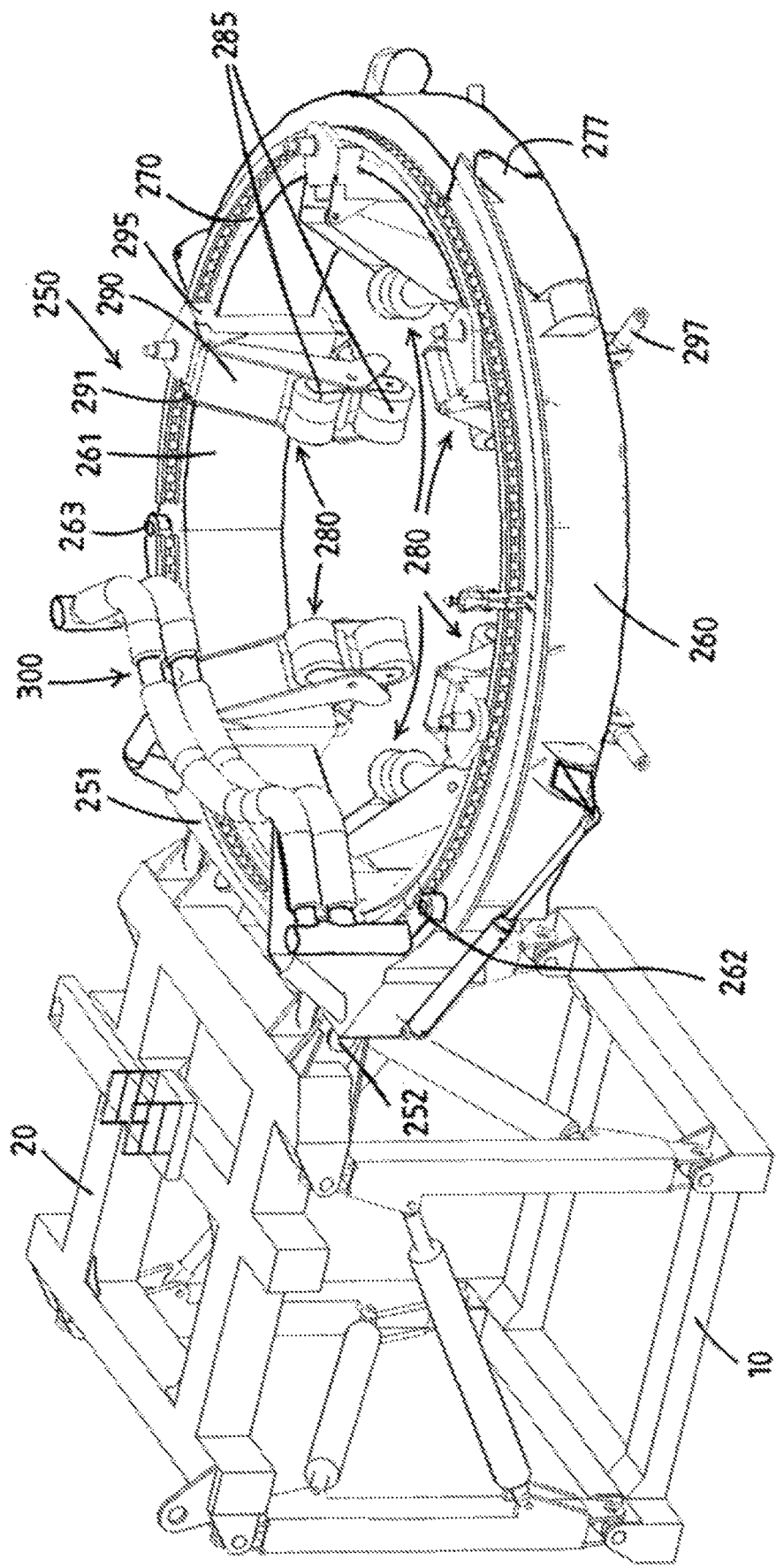
FIG. 15 depicts another embodiment of a pile holding system according to the invention.

FIG. 15 depicts another embodiment of a wave-induced motion compensated pile holding system to be mounted on a vessel, e.g. for installation of a pile adapted to support an offshore wind turbine.

The system comprises:
a base frame 10 to be mounted on the vessel;
a support frame 20 arranged above the base frame at a distance thereof;
a support system for moveably supporting the support frame from the base frame having an active motion compensated actuation system for moving the support frame relative to the base frame, e.g. as described herein already.

The pile holder 250 comprises a base structure 251 mounted to the support frame 20. In this embodiment, the base structure 251 is pivotally mounted to the support frame 20 to pivot relative to the support frame 20 about base pivot axis 252 between a substantially vertical orientation and a substantially horizontal orientation. In this example it is envisaged that this tilting is only in view of sailing with the vessel, mooring in a port, etc., as it is envisaged that a pile is hoisted by a crane and placed in vertical orientation before engagement thereof by the pile holder 250.

The pile holder 250 has an annular structure of which a section is formed by the base structure 251, and of which the remainder is formed by two semi-circular jaws 260, 261. These jaws 260, 261 are each pivotally connected at an inner end thereof to a respective pivot part of the base structure 251 and pivotal about a pivot axis 262, 263 between a closed position, wherein outer ends of the jaws 260, 261 join up, and an opened position. The actuation of each jaw 260, 261 is done by a jaw actuator, e.g. a hydraulic cylinder 265. A locking mechanism 277 is preferably provided to lock the outer ends of the semi-circular jaws 260, 261 to one another.

The annular structure of the pile holder 250, as preferred, is provided with a circular support track structure 270 that carries multiple pile engaging devices 280, here with pile guiding rollers 285, e.g. four or more, here six, of such devices.

The pile engaging devices 280 are movable along the circular support track structure, at least one or more of them, at least over an arc segment of the circle, so as to allow for adaptation of the angular position of the pile engaging devices 280 relative to the passage for the pile.

Each pile engaging device 280, as preferred, carries one or more, here a pair of two, pile guiding rollers 285 in a movable manner allow for adjustment of the radial position of the rollers 285 relative to the passage for the pile. Here each pile engaging device comprises a suspension arm 290 that pivotal about a horizontal axis 291, here as preferred from a top end of the arm 290, relative to a chassis 295 of the device that is supported on the track structure 270.

A suspension arm actuator, here a hydraulic cylinder 297, is provided between the chassis 295 and the arm 290 to adjust the radial position of the roller(s) 285.

Each chassis 295 here is provided with a motorized drive adapted to move the chassis 295 along, possibly a section of, the circular track structure so as to adjust the angular position of the device 280.

A fender structure 300 is mounted here, as preferred, on the base structure, e.g. in view of a rough positioning of the pile relative to the pile holder.

The invention claimed is:
1. A method for installation of a pile adapted to support an offshore wind turbine, comprising the following steps:
   a. transporting a pile in a horizontal orientation to an offshore installation site;
   b. positioning the pile in a pile holder on an installation vessel while being in a horizontal orientation, wherein the pile holder engages with a circumference of the pile at a lower side thereof to hold the pile in order to limit movement of the lower side of the pile in a direction perpendicular to a longitudinal axis of the pile, and wherein the pile holder engages with a lower end of the pile in order to limit movement of the pile in a direction parallel to the longitudinal axis of the pile;
   c. lifting an upper end portion of the pile with the lower side in the pile holder thereby rotating the pile from a horizontal orientation to a vertical orientation about a substantially horizontal rotation axis perpendicular to the longitudinal axis of the pile, wherein after rotating the pile from the horizontal orientation to the vertical orientation the pile is located outside the contour of the vessel seen from above to be lowered into the water;

d. disengaging the pile holder from the lower end of the pile;
e. lowering the pile into the water while being guided by the pile holder,
wherein during steps b. to e. the vessel is in a floating condition, and
wherein during step e., the pile holder is compensated for wave-induced motion of the vessel to maintain a predetermined position of the pile holder in an X-Y plane independent of the wave-induced motion of the vessel by operating an actuation system for moving a support frame to which the pile holder is mounted relative to a base frame mounted on the vessel in the X-Y plane.

2. The method according to claim 1, wherein step c. is carried out by a crane on the installation vessel.

3. The method according to claim 1, wherein the pile holder is mounted on the vessel to rotate relative to the vessel about the horizontal rotation axis between a receiving position to receive the pile in a horizontal orientation and a lowering position in which the pile can be lowered into the water while being in a substantially vertical orientation, wherein in step b. the pile holder is in the receiving position, and wherein in step c. the pile holder is moved along with the pile to the lowering position.

4. The method according to claim 1, wherein the pile holder comprises a pile support to engage with the lower end of the pile in order to limit movement of the pile in a direction parallel to the longitudinal axis of the pile, wherein step d., disengaging the pile holder from the lower end of the pile, comprises the steps:
  d1. lifting the pile from the pile support; and
  d2. moving the pile support out of the way in a direction perpendicular to the longitudinal axis of the pile.

5. The method according to claim 1, wherein the pile holder comprises a pile support to engage with the lower end of the pile in order to limit movement of the pile in a direction parallel to the longitudinal axis of the pile, wherein step d., disengaging the pile holder from the lower end of the pile, comprises the steps:
  d1. moving the pile support away from the pile in a direction parallel to the longitudinal axis of the pile; and
  d2. moving the pile support out of the way in a direction perpendicular to the longitudinal axis of the pile.

6. The method according to claim 1, wherein step e., lowering the pile into the water by being held by the pile holder comprises the steps:
  e1. lowering the pile until the pile reaches the sea bottom and passive lowering due to gravity stops; and
  e2. actively driving the pile deeper into the sea bottom by applying downwardly directed forces to the upper end portion of the pile.

7. The method according to claim 6, wherein step e1. is carried out by a crane on the installation vessel, wherein during a part of the lowering in step e1. the upper end portion of the pile is compensated for wave-induced motion of the vessel to maintain a predetermined position of the pile in the X-Y plane independent of the wave-induced motion of the vessel.

8. A wave-induced motion compensated pile holding system to be mounted on a vessel, comprising:
  a base frame to be mounted on the vessel;
  a support frame arranged above the base frame at a distance thereof;
  a support system for moveably supporting the support frame from the base frame;
  an active motion compensated actuation system for moving the support frame relative to the base frame;
  a control unit; and
  a pile holder mounted on the support frame,
  wherein the support system is provided between the base frame and the support frame to move the support frame parallel to the base frame in two orthogonal horizontal directions and in an X-Y plane,
  wherein the actuation system comprises a first actuator to move the support frame in one of the two orthogonal directions, and a second actuator to move the support frame in the other one of the two orthogonal directions,
  wherein the pile holder comprises a plurality of rollers to engage with a pile to hold the pile and to allow the pile to move in a direction parallel to the longitudinal axis of the pile relative to the pile holder, and
  wherein the control unit provides an active wave-induced motion compensation mode in which the actuation system is operated to maintain a predetermined position of the pile holder in the X-Y plane, independent of the wave-induced motion in the X-Y plane of the vessel.

9. A pile holding system according to claim 8, wherein the pile holder is rotatable about a substantially horizontal rotation axis relative to the support frame between a horizontal orientation, in which the pile holder is able to hold the pile in a substantially vertical orientation, and a vertical orientation.

10. A pile holding system according to claim 9, wherein the pile holder comprises:
  a base structure;
  two arms provided at opposite ends of the base structure;
  a separate jaw per arm; and
  a driving mechanism,
  wherein the base structure is mounted on the support frame,
  wherein the arms are pivotably mounted to the base structure about respective arm pivot axes,
  wherein a jaw is pivotably mounted to a respective arm about a respective jaw pivot axis,
  wherein a jaw provides two distinct pile engaging portions including rollers, and
  wherein the driving mechanism is operable on the two arms to move the arms about the arm pivot axes between an open position for receiving a pile and a closed position in which the pile engaging portions of the jaws can engage with a pile.

11. A pile holding system according to claim 9, wherein the base structure is rotatably mounted on the support frame to allow the pile holder to be rotated about the substantially horizontal rotation axis.

12. A vessel comprising a pile holding system according to claim 9, wherein the base frame of the pile holding system is mounted on the vessel.

13. The vessel according to claim 12, wherein the pile holding system is arranged at a stem of the vessel to hold a pile outside the contour of the vessel seen from above at a stem side of the vessel.

14. The vessel according to claim 12, further comprising a crane to handle a pile, wherein the crane is arranged at a stern of the vessel in line with a centre of gravity of the vessel.

15. The vessel according to claim 14, wherein the pile holding system is arranged next to the crane, the vessel further comprising a storage location at a stern of the vessel at a side of the crane opposite to the side where the pile holding system is arranged, which storage location allows to store a pile driving mechanism to drive a pile into a sea bottom.

16. The vessel according to claim 12, wherein the vessel comprises deck space to store piles in a horizontal orientation parallel to the longitudinal axis of the vessel.

17. A pile holder for holding a pile, comprising:
a base structure; and
an annular structure configured to extent about a passage for a pile to be handled by the pile holder, the base structure forming a section of the annular structure,
wherein the annular structure comprises two semi-circular jaws, each pivotally connected at an inner end thereof and pivotal about a pivot axis between a closed position, where outer ends of the jaws join up, and an opened position,
wherein the annular structure is provided with a circular support track structure that carries multiple pile engaging devices having pile guiding rollers; and
a driving mechanism,
wherein the driving mechanism is operable on the two semi-circular jaws to move the semi-circular jaws about the pivot axes between the open position for receiving a pile and the closed position in which the pile engaging devices can engage with a pile, and
wherein one or more of the pile engaging devices are movable along the circular support track structure, at least over an arc segment of the circle, so as to allow for adaptation of an angular position of the one or more pile engaging devices relative to the passage for the pile.

18. The pile holder according to claim 17, wherein each pile engaging device carries one or more of the pile guiding rollers in a movable manner to allow for adjustment of a radial position of the pile guiding rollers relative to the passage for the pile.

19. The pile holder according to claim 18, wherein a suspension arm actuator is provided between a chassis of the pile engaging devices and the suspension arm to adjust the radial position of the rollers.

20. The pile holder according to claim 19, wherein each chassis is provided with a motorized drive adapted to move the chassis along the circular support track structure so as to adjust the angular position of the pile engaging device.

* * * * *